US012756588B2

(12) United States Patent
Gatzke et al.

(10) Patent No.: US 12,756,588 B2
(45) Date of Patent: Oct. 6, 2026

(54) VIRTUAL MEETING SCHEDULING AND MONITORING BASED ON SUSTAINABILITY ATTRIBUTES

(71) Applicant: Cisco Technology, Inc., San Jose, CA (US)

(72) Inventors: Alan Gatzke, Bainbridge Island, WA (US); Niall L. McDonnell, Galway (IE); Jeff Wolfeld, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 141 days.

(21) Appl. No.: 18/930,866

(22) Filed: Oct. 29, 2024

(65) Prior Publication Data

US 2025/0055719 A1 Feb. 13, 2025

Related U.S. Application Data

(63) Continuation of application No. 18/319,228, filed on May 17, 2023, now Pat. No. 12,166,598.

(51) Int. Cl.
*H04L 12/18* (2006.01)
*H04L 65/403* (2022.01)

(52) U.S. Cl.
CPC ........ *H04L 12/1822* (2013.01); *H04L 65/403* (2013.01)

(58) Field of Classification Search
CPC .............................. H04L 67/14; H04L 65/403
See application file for complete search history.

(56) References Cited

U.S. PATENT DOCUMENTS

| | | | | |
|---|---|---|---|---|
| 2014/0006080 | A1 | 1/2014 | Yusa | |
| 2014/0114867 | A1 | 4/2014 | Volkmann et al. | |
| 2018/0224920 | A1 * | 8/2018 | Oakley | H04L 12/4625 |
| 2019/0087757 | A1 * | 3/2019 | Tyagi | H02J 3/381 |
| 2019/0236915 | A1 | 8/2019 | Marshall | |

(Continued)

OTHER PUBLICATIONS

Travers K., "How to Reduce the Environmental Impact of Your Next Virtual Meeting," Massachusetts Institute of Technology (MIT) News, Mar. 4, 2021, pp. 1-5.

*Primary Examiner* — Chirag R Patel
(74) *Attorney, Agent, or Firm* — Rutan & Tucker, LLP; Ravi Mohan; Marc A. McClain

(57) ABSTRACT

Devices, systems, methods, and processes for dynamically generating indications regarding the sustainability of one or more virtual meeting options is described herein. Virtual meetings can have participants join from all over the world and from very different computing devices which can each be powered by different power source types. When selecting a time for a virtual meeting between a number of participants, a large number of combinations may occur with each option having a different level of sustainability associated with it. However, by accessing historical data, sustainability data, participant data and by gathering various virtual meeting settings, a plurality of options can be presented having one or more indications associated with a particular category of sustainability. A sustainability threshold may be determined and utilized to categorize virtual meeting options as well. This sustainability threshold can also be utilized to dynamically alter configurations during the meeting to stay under that threshold.

20 Claims, 10 Drawing Sheets

(56) References Cited

U.S. PATENT DOCUMENTS

| | | | |
|---|---|---|---|
| 2021/0319408 | A1 | 10/2021 | Jorasch et al. |
| 2021/0400142 | A1 | 12/2021 | Jorasch et al. |
| 2024/0048513 | A1 | 2/2024 | Tessler et al. |

* cited by examiner

VIRTUAL MEETING SCHEDULING AND MONITORING BASED ON SUSTAINABILITY ATTRIBUTES

This application is a continuation filing of U.S. Non-Provisional patent application Ser. No. 18/319,228, filed May 17, 2023, which is incorporated by reference herein in its entirety.

The present disclosure relates to online meeting collaborations. More particularly, the present disclosure relates to dynamically scheduling meeting times and adjusting one or more virtual meeting features based on sustainability data.

BACKGROUND

Virtual meetings have become increasingly popular in recent years, especially since the COVID-19 pandemic made remote work and social distancing the norm. Virtual meetings can refer to any type of meeting that takes place over the internet, using video conferencing software or other tools. These tools can be operated on personal computing devices and even mobile computing devices such as smartphones, tablets, etc.

Virtual meetings have many advantages. For example, people can collaborate from anywhere in the world, which is especially helpful for teams that are distributed across different locations. Virtual meetings also save time and money by eliminating the need for travel, as well as reducing the need for physical office space. In addition, virtual meetings can be recorded, which can be useful for reviewing discussions and decisions later on.

During a virtual meeting, participants generate and transmit various types of data. This includes audio data, such as speech and background noise captured by microphones, and video data, such as images of participants and their surroundings captured by cameras. Text data, including chat messages and typed messages, is also generated, and transmitted between participants. Additionally, screen sharing data, which includes content shared from one participant's screen to others, and metadata, such as the date and time of the meeting and participant information, are also transmitted.

As a result, many resources may be utilized to facilitate the transmission of this data. These resources can include the use of electricity generated from a variety of non-sustainable power sources. Because participants to virtual meetings can come from all over the world and use a variety of different types of devices powered by different sustainable or non-sustainable power source types, it is often difficult to select a virtual meeting time with reference to sustainability options.

SUMMARY OF THE DISCLOSURE

Systems and methods for scheduling virtual meetings based on sustainability attributes in accordance with embodiments of the disclosure are described herein. In some embodiments, a virtual meeting device includes a processor, a memory communicatively coupled to the processor, a communication port coupled with a second device, and a virtual meeting logic. The virtual meeting logic can be configured to receive a request to establish a virtual meeting with a plurality of participants, gather one or more virtual meeting settings associated with each of the plurality of participants, determine at least one sustainability attribute associated with the virtual meeting, provide one or more virtual meeting options based on the one or more virtual meeting settings and the at least one sustainability attribute, receive a virtual meeting option selection, and establish the virtual meeting with the second device based on the received selection.

In some embodiments, the one or more virtual meeting settings include at least: participant connection type, participant camera settings, or participant status.

In some embodiments, the at least one sustainability attribute associated with the virtual meeting can include at least: participant device info, participant location, or participant power source type.

In some embodiments, the virtual meeting logic is further configured to determine a sustainability threshold associated with the virtual meeting.

In some embodiments, providing the one or more virtual meeting options includes displaying one or more indications based on the determined sustainability threshold.

In some embodiments, the one or more indications are a plurality of unique colors for each indication.

In some embodiments, the displaying the one or more indications include showing a first plurality of meeting times with a first indication color in response to the sustainability attributes associated with the second plurality of meeting times being below the determined sustainability threshold.

In some embodiments, the unique color association with the first indication is green.

In some embodiments, the displaying the one or more indications include showing a second plurality of meeting times with a second indication color in response to the sustainability attributes associated with the second plurality of meeting times being above the determined sustainability threshold.

In some embodiments, the unique color association with the first indication is red.

In some embodiments, the displaying the one or more indications include showing a third plurality of meeting times with a third indication color in response to the meeting time being within a predetermined range of the determined sustainability threshold.

In some embodiments, the unique color association with the first indication is yellow.

In some embodiments, providing the one or more virtual meeting options includes displaying one or more suggested virtual meeting times and configurations based on the determined sustainability threshold.

In some embodiments, the one or more suggestions are configured to minimize the negative environmental impacts of the virtual meeting.

In some embodiments, a virtual meeting device includes a processor, a memory communicatively coupled to the processor, a communication port coupled with a second device, and a virtual meeting logic. The virtual meeting logic can be configured to receive a request to establish a virtual meeting with a plurality of participants, gather one or more virtual meeting settings associated with each of the plurality of participants, and determine at least one sustainability attribute associated with the virtual meeting. The virtual meeting logic may also provide one or more virtual meeting options based on the one or more virtual meeting settings and the at least one sustainability attribute, receive a virtual meeting option selection, establish the virtual meeting with the second device based on the received selection, and monitor the sustainability attributes associated with the virtual meeting during the virtual meeting; and determine if the sustainability attributes associated with the virtual meeting have exceeded a predetermined threshold.

In some embodiments, in response to determining that the sustainability attributes associated with the virtual meeting have exceeded the predetermined threshold, generate at least one notification indicating the exceeding of the threshold.

In some embodiments, in response to determining that the sustainability attributes associated with the virtual meeting have exceeded the predetermined threshold, disable one or more settings within the virtual meeting until the sustainability attributes associated with the virtual meeting are no longer exceeding the predetermined threshold.

In some embodiments, a method for administering virtual meetings, includes receiving a request to establish a virtual meeting with a plurality of participants operating computing devices on a network, gathering one or more virtual meeting settings associated with each of the plurality of participants and their computing devices, and determining at least one sustainability attribute associated with the virtual meeting. The method may further include providing one or more virtual meeting options to a virtual meeting administrator based on the one or more virtual meeting settings and the at least one sustainability attribute, receiving a virtual meeting option selection, and establishing the virtual meeting with the computing devices based on the received selection.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein.

Figure 1:
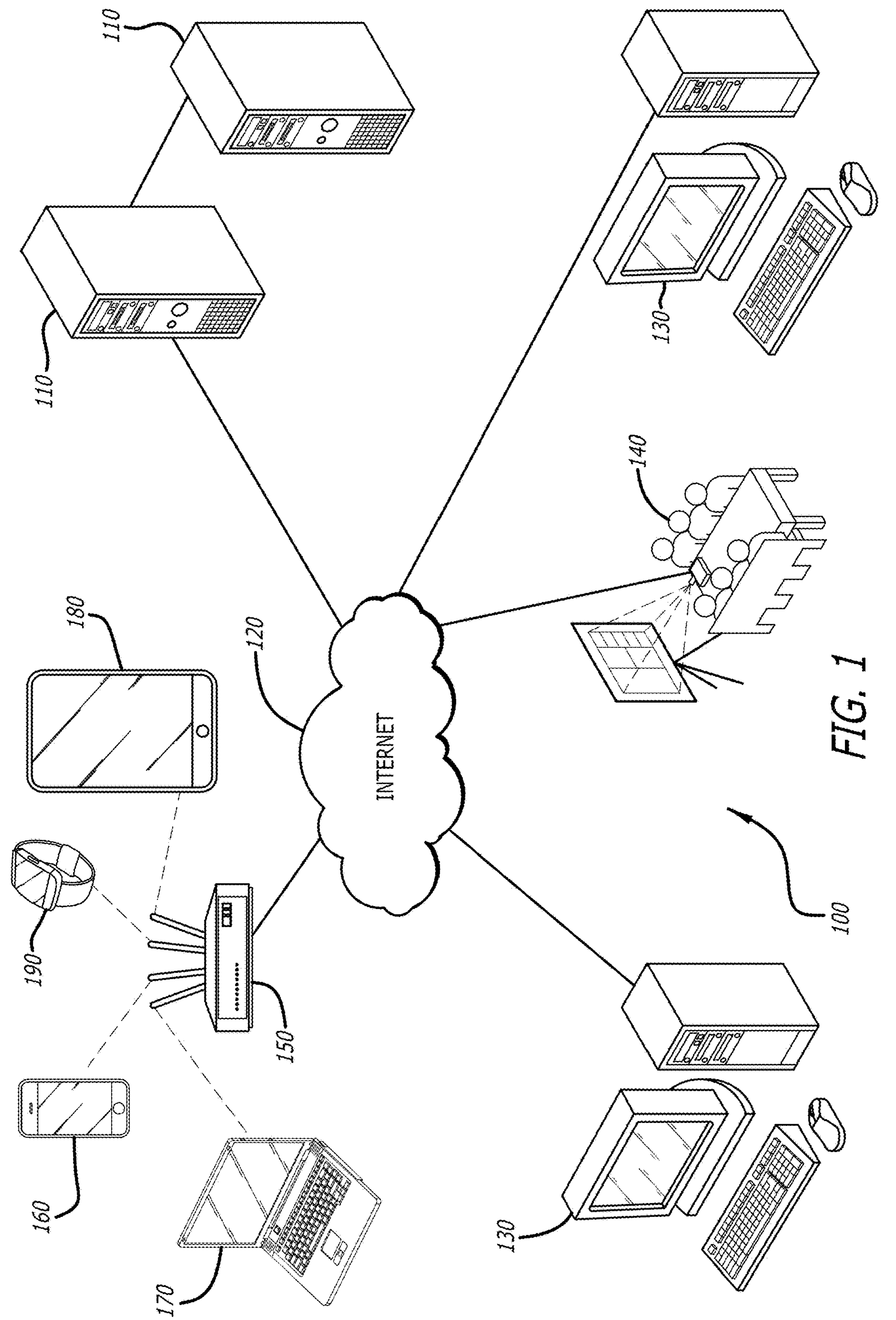
FIG. 1 is a conceptual illustration of a network with network devices suitable for conducting virtual meetings in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that allow for setting up and conducting a virtual meeting based on a sustainability amount. In many embodiments, the options for a virtual meeting can include categorized sustainability levels presented via one or more indications, such as when selecting a time to have the meeting. In more embodiments, a sustainability threshold level can be set to limit or encourage selection of a virtual meeting option. In still additional embodiments, the sustainability threshold may be utilized during a virtual meeting to enable and/or disable one or more settings or participant configurations (such as turning off a camera, etc.) in order to keep the virtual meeting below the determined sustainability threshold.

In some embodiments, when a virtual meeting host/organizer attempts to schedule an on-line meeting, in the client interface they can navigate to a calendar showing a combined view of free/busy availability for all of the invited meeting participants. In addition to the free/busy information, the virtual meeting back-end cloud service may also retrieve the forecasted energy resources required to host that meeting. So, in a non-limiting example, for each particular block of minutes in the calendar display (where the block of time may be a system admin configurable amount of time), the virtual meeting system can determine the forecasted carbon footprint requirements (or sustainability levels) for that meeting. The blocks of time requiring the lowest carbon footprint would be displayed as green. The blocks of time requiring the highest carbon footprint would be displayed as red. Yellow would indicate a block of time requiring more of a carbon footprint than green but less than orange. Orange would require more than yellow but less than red. As those skilled in the art will recognize, the colors and thresholds would be configurable by the system admin and may include more or fewer colors, categories, or indications as needed to realize the desired application.

Various services may provide (and forecast) sustainability-related attributes of the virtual meeting, such as, but not limited to, the carbon emission intensity of the current electricity supply in a region. Using APIs from those resources could help determine the sustainability attributes for a given virtual meeting. In further embodiments, the virtual meeting host datacenter's forecasted electrical usage along with the combined carbon intensity of the energy supply at each participant's PC/device may be utilized to generate sustainability data. In additional embodiments, the carbon intensity of the network path between the media servers and participant end points can also be considered, gathered, and utilized to classify virtual meeting options.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual illustration of a network with network devices suitable for conducting virtual meetings in accordance with various embodiments of the disclosure is shown. In many embodiments, the network 100 may comprise a plurality of devices that are configured to transmit and receive data related to providing, recording, and processing virtual meetings (i.e., online collaborations). In various embodiments, virtual meeting service servers 110 are connected to a wide-area network such as, for example, the Internet 120. In further embodiments, virtual meeting service servers 110 can be configured to transmit a variety of data across the Internet 120 to any number of computing devices such as, but not limited to, personal computers 130, virtual presentation devices 140, and mobile computing devices including laptop computers 170, cellular phones 160, portable tablet computers 180 and wearable computing devices 190. In additional embodiments, virtual meeting data may be mirrored or otherwise supplemented in additional cloud-based service provider servers or edge network systems. In still additional embodiments, the virtual meeting service servers 110 can be hosted as virtual servers within a cloud-based service.

In further embodiments, the sending and receiving of virtual meeting data can occur over the Internet 120 through wired and/or wireless connections. In the embodiment depicted in FIG. 1, the mobile computing devices are connected wirelessly to the Internet 120 via a wireless network access point 150. It should be understood by those skilled in the art that the types of wired and/or wireless connections between devices on the network 100 can be comprised of any combination of devices and connections as needed.

In various embodiments, the network 100 may broadly accept virtual meeting data, such as, but not limited to audio and video data from users via personal computers 130, virtual presentation devices 140, and/or mobile computing devices. These embodiments may, based on one or more thresholds or other network conditions/configurations, that video data may need to be transmitted to very other device within a virtual meeting. This may require determining the quantity of video transmissions within the virtual meeting. In more embodiments, the video being transmitted within the video data can utilize a reduced size video transmission data rate to transmit video frames at a lower rate than the standard frame rate, thereby reducing the amount of data that needs to be transmitted and processed over the Internet 120.

As discussed in more detail below, virtual meetings can be established that have a certain configuration. Based upon this configuration, various sustainability attributes data can be collected. Different video transmission rates for example, can be selected based on the collected sustainability attributes data which allows for the transmission of a reduced size video transmission within a video stream of the virtual meeting. Other configurations may occur such as one or more participants utilizing a camera while others do not. These various settings, along with other such as power source type, and time of meeting may result in a variety of different sustainability levels associated with one or more virtual meeting time options. As described herein, different indications can be given to participants to encourage the selection of various virtual meeting options in order to facilitate more sustainable virtual meetings.

Although a specific embodiment for a network 100 suitable for utilizing a reduced size video transmission data rate within a virtual meeting is described above with respect to FIG. 1, any of a variety of systems and/or processes may be utilized in accordance with embodiments of the disclosure. For example, the virtual meeting service servers 110 may be configured to receive video data and transfer it to another device within the network 100. In this way, it may be configured as a relay of the video data which can affect the overall sustainability of the meeting. The elements depicted in FIG. 1 may also be interchangeable with other elements of FIGS. 2-10 as required to realize a particularly desired embodiment.

Figure 2:
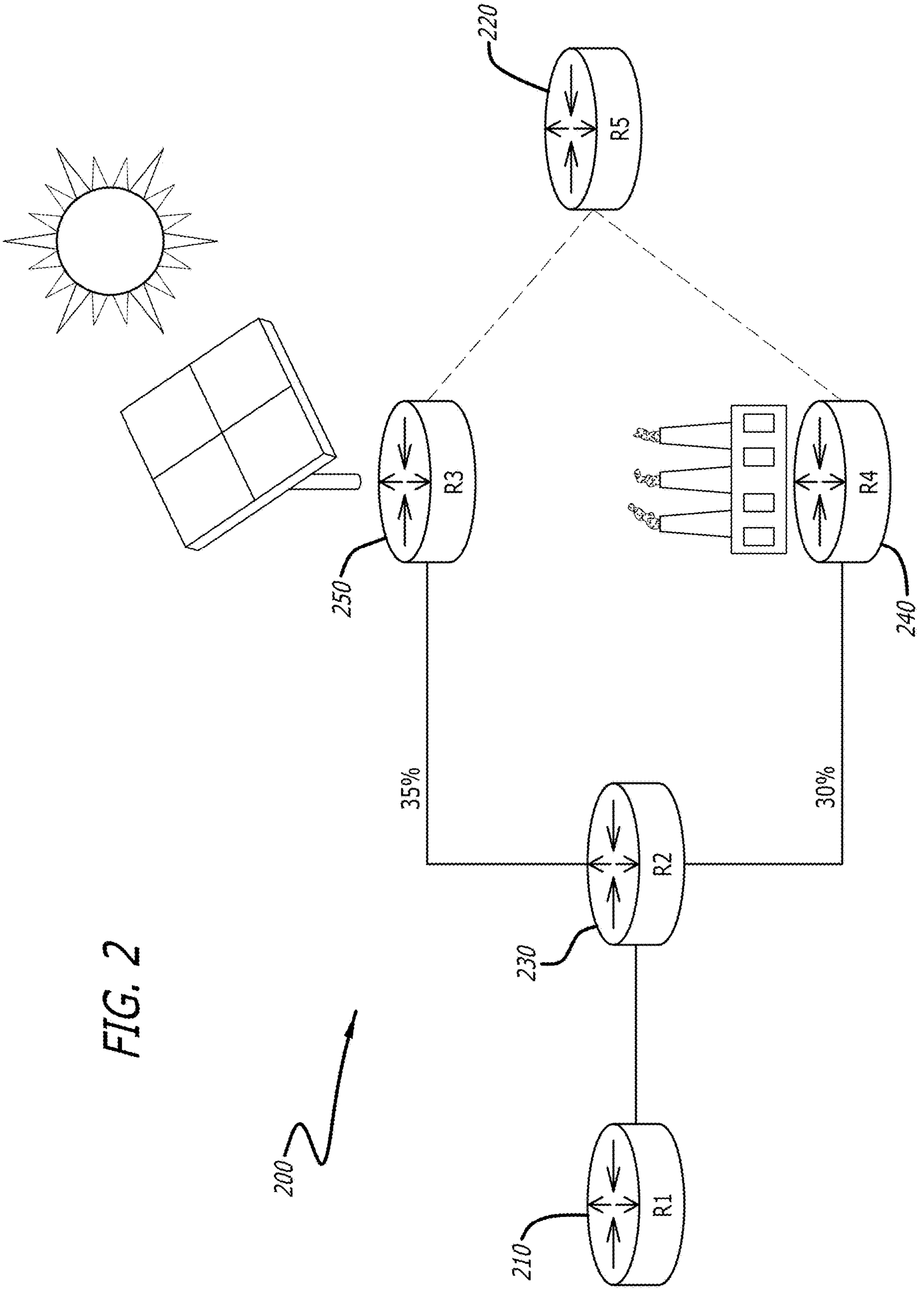
FIG. 2 is a simplified diagram of a network of devices suitable for virtual meetings powered by different power source types in accordance with various embodiments of the disclosure.

Referring to FIG. 2, a simplified diagram of a network of devices suitable for virtual meetings powered by various power source types in accordance with various embodiments of the disclosure is shown. The network 200 can include a plurality of devices, e.g., routers, which can be in communication with each other and/or a remote server, which may be connected to the network via a router 220 (R5). The network 200 depicted in FIG. 2 is shown as a simplified, conceptual network where a router 210 (R1) is connected to a router 230 (R2) which may route data to router 250 (R3) or router 240 (R4) onward to router 220 (R5). Those skilled in the art will understand that a network 200 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the case of reading.

Traditionally, devices operating within a network 200 have not considered various aspects of operation that can relate to the overall sustainability of the network. For example, devices in communication networks have often used grid-supplied energy as a primary power source. This grid-supplied energy can regularly provide energy that has been generated by a non-sustainable or negative environmental impacts-heavy power source such as a coal-powered power plant. However, modern power grids often have more diverse and cleaner energy sources for the provided generated energy. Some devices can still be powered by power sources that utilize fossil fuels, such as the router 240 (R4) as depicted in FIG. 2. Alternatively, some devices can operate by using renewable sources of energy, such as the router 250 (R3) which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability attributes.

In the embodiment depicted in FIG. 2, the operation of a non-sustainable coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean (er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network and/or virtual meetings, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network and/or virtual meeting operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to a subsequent event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability attributes of that network device. During operation, one or more devices within the network may seek and collect the sustainability attributes of various network devices, which can provide insight into both the type of power source providing power to the device, but also the various capabilities of the network device that may be activated to provide more efficient operation.

Additionally, when generating various scores, metrics, or other evaluations of the network devices within a network 200, the sustainability attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 200 is described above with respect to FIG. 2, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 2 may also be interchangeable with other elements of FIGS. 1 and 3-10 as required to realize a particularly desired embodiment.

Figure 3:
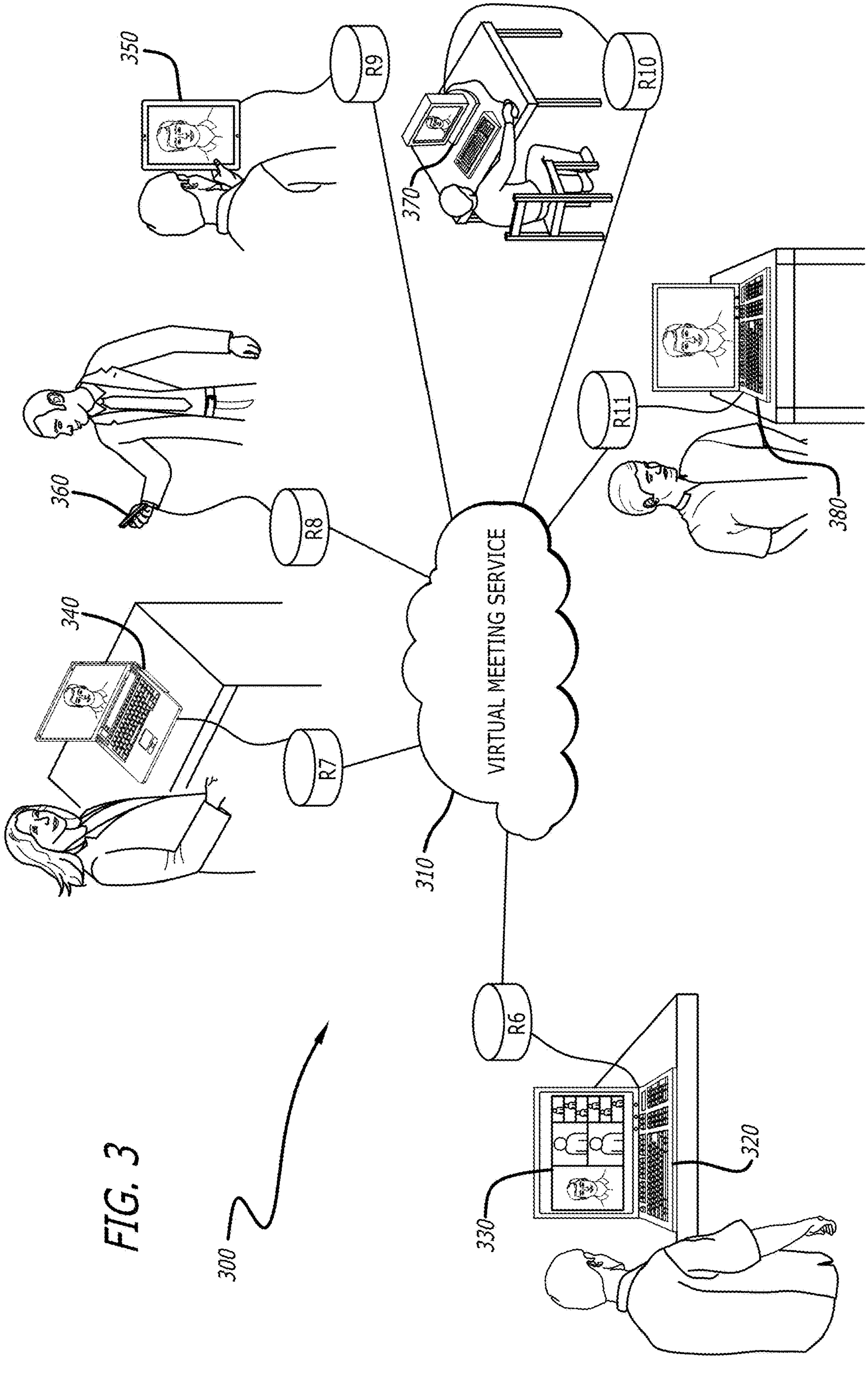
FIG. 3 is a conceptual schematic diagram of a one-to-many virtual meeting in accordance with various embodiments of the disclosure.

Referring to FIG. 3, a conceptual schematic diagram of a one-to-many virtual meeting 300 in accordance with various embodiments of the disclosure is shown. In some virtual meetings, it can be configured such that one (or a few) people are the main subjects of the meeting and that many other attendees will be primarily watching them. During these one-to-many meetings, there is a majority of dialogue from the presenter to the attendees.

In the embodiment depicted in FIG. 3, the presenter may utilize their personal computing device, such as a first laptop 320 to capture and generate a video transmission (conceptually shown as the subject captured in frame). The virtual meeting can be facilitated by a virtual meeting service 310 that can connect one or more attendees together. The presenter may connect to the virtual meeting service over a network through a plurality of network devices (conceptually shown as router R6). During the presentation of the virtual meeting, the video transmission 330 can be transmitted to the various attendees, such as to a second laptop 340 (through a plurality of network devices conceptually shown as router R7), a smartphone 360 (through a plurality of network devices conceptually shown as router R8), a tablet 350 (through a plurality of network devices conceptually shown as router R9), a desktop computer (through a plurality of network devices conceptually shown as router R10), and a third laptop 380 (through a plurality of network devices conceptually shown as router R11).

During the virtual meeting, the video transmission 330 can be shown on each of the network-connected devices of the attendees. In some embodiments, to increase the overall sustainability of the virtual meeting, a reduced amount of data may be required to be transmitted by the virtual meeting service 310. In some embodiments, the virtual meeting service 310 may receive a video transmission 330 that includes a full data stream (non-compressed, etc.) from the presenter and determine a best energy-saving video transmission rate for each attendee based on one or more factors. Other configurations may be realized that can affect the amount of sustainability that can be achieved within these types of meetings.

Figure 4:
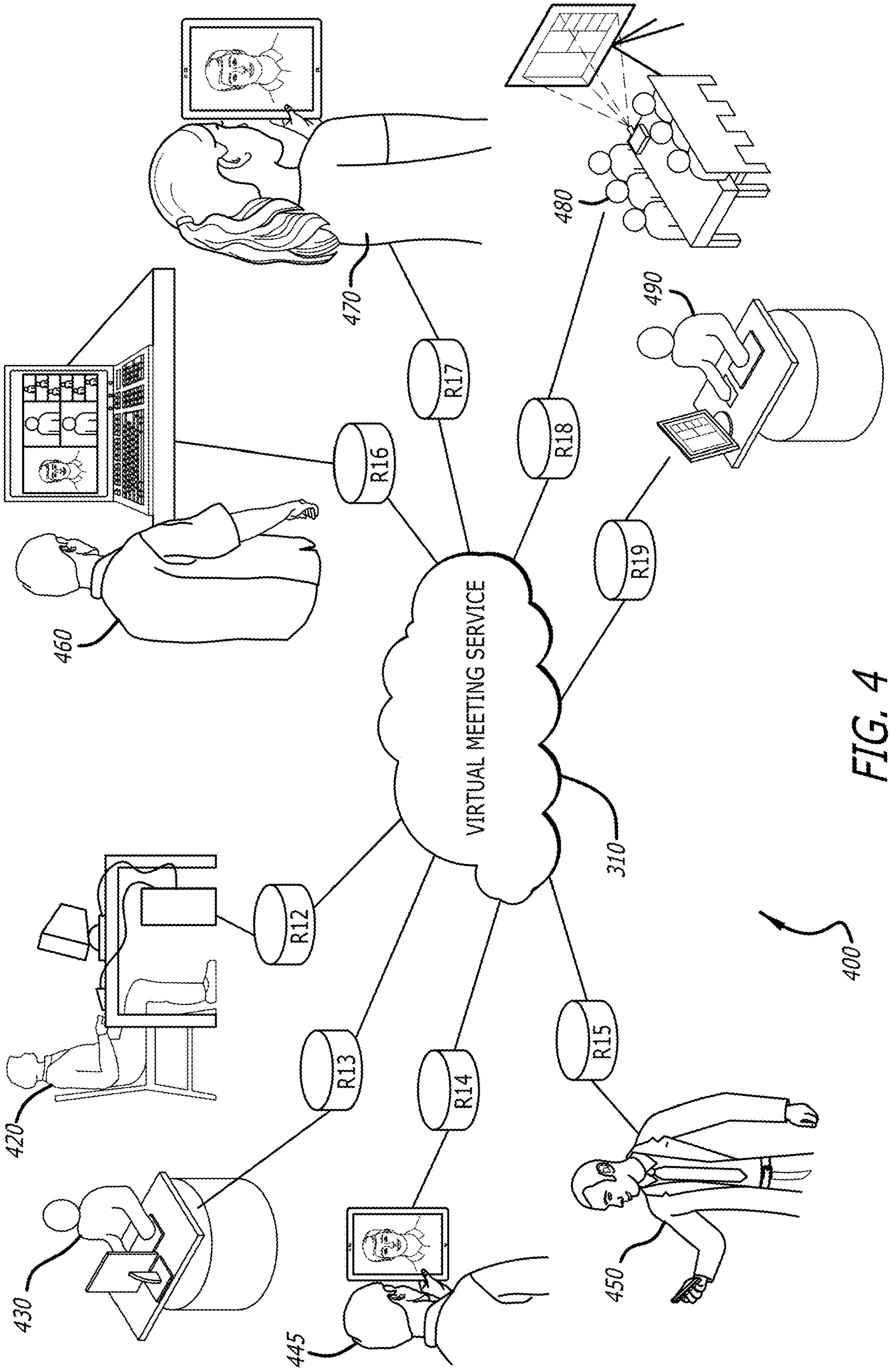
FIG. 4 is a conceptual schematic diagram of a many-to-many virtual meeting in accordance with various embodiments of the disclosure.

Referring to FIG. 4, a conceptual schematic diagram of a many-to-many virtual meeting 400 in accordance with various embodiments of the disclosure is shown. In some virtual meetings, it can be configured such that everyone can be the main subject of the meeting depending on who is speaking. During these many-to-many meetings, no attendee necessarily has a majority of dialogue during the meeting.

In the embodiment depicted in FIG. 4, the attendees 420-490 may utilize their available computing devices, such as, but not limited to, laptop computers, desktop computers, smartphones, tablets, and/or presentation devices to capture and generate a video transmission. Each attendee or participant may be located in different areas of the planet and may have power provided by different types of power sources. Likewise, these attendees 420-490 may each have different types of devices with different sustainable configurations and/or power usage footprint. These different computing devices can each be connected to a virtual meeting service 310 through a plurality of network devices conceptually shown as routers R12-R19. The virtual meeting service 310 can connect one or more attendees together.

Similar to the virtual meeting depicted in FIG. 3, the video transmission can be shown on each of the network-connected devices of the attendees 420-490. However, to increase the sustainability of the virtual meeting, each participant may provide or have data accessed that can indicate a more suitable or optimal time to have the meeting based on one or more sustainability metrics. In some embodiments, the host of the virtual meeting may poll each attendee 420-490 prior to the meeting on their expected location and device configuration. Based on this, the host may select an optimal time to conduct the meeting based at least in part on the level of sustainability expected for a given time. In additional embodiments, the system, host, or other administrator of the virtual meeting may set a determined sustainability threshold for the virtual meeting. In these embodiments, various configurations of the host and/or attendees may be adjusted dynamically to retain the virtual meeting within the sustainability threshold. For example, the video transmission rate of the host may be lowered, or one or more camera feeds from attendees 420-490 may be disabled, etc. However, other variations are contemplated in order to keep a virtual meeting within a given sustainability threshold.

Although specific embodiments for virtual meetings are described above with respect to FIGS. 3-4, any of a variety of systems and/or processes may be utilized in accordance with embodiments of the disclosure. For example, the virtual meetings may be conducted in a peer-to-peer configuration wherein the processes carried out by the virtual meeting service 310 are instead conducted on one or more of the client applications within the computing devices of the attendees. The elements depicted in FIGS. 3-4 may also be interchangeable with other elements of FIGS. 1-2 and 5-10 as required to realize a particularly desired embodiment.

Figure 5:
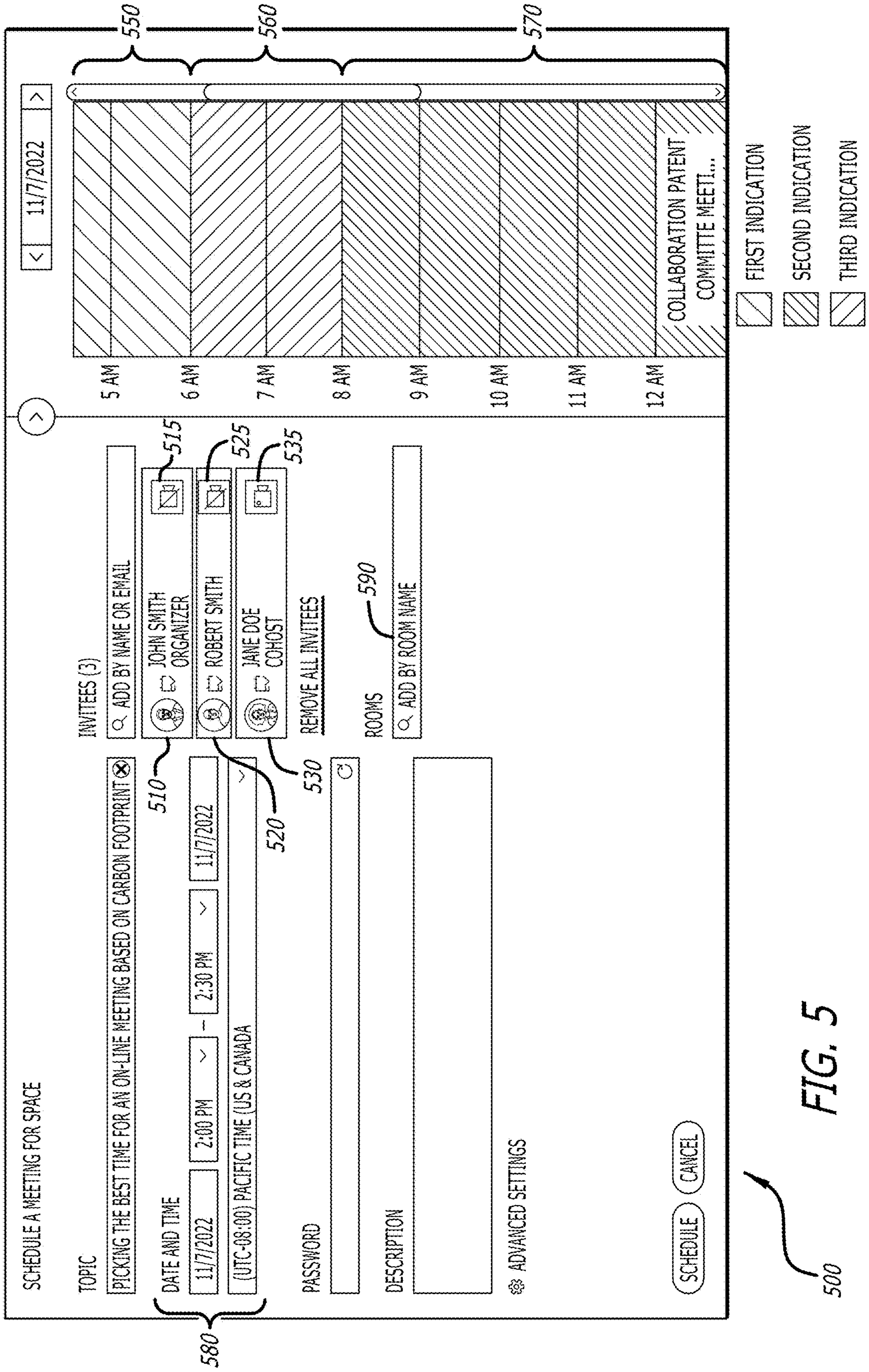
FIG. 5 is a conceptual illustration of a virtual meeting scheduling interface with a plurality of indications associated with sustainability in accordance with various embodiments of the disclosure.

Referring to FIG. 5, a conceptual illustration of a virtual meeting scheduling interface 500 with a plurality of indications 550-570 associated with sustainability in accordance with various embodiments of the disclosure is shown. When setting up virtual meetings, a host and/or participant may be able to select or vote for a time that is suitable for them. Often, the level of sustainability associated with each virtual meeting time and/or option may vary greatly. Thus, in many embodiments, a virtual meeting scheduling interface 500 can be configured to display one or more virtual meeting options that is associated with a plurality of indications 550-570 that can be based off of a sustainability threshold that is assigned to the virtual meeting.

In a number of embodiments, the virtual meeting scheduling interface 500 can provide a host/attendee/participant with variety of options. In the embodiment depicted in FIG. 5 for example, the virtual meeting has three invitees. The first invitee 510 ("John Smith") is shown with a name, virtual meeting title, avatar/picture icon, and a first camera toggle button 515. Likewise, a second invitee 520 ("Robert Smith") is shown with similar information, sans a virtual meeting title which indicates they are an attendee only, and a second camera toggle button 525. Finally, a third invitee 530 ("Jane Doe") is shown with a personalized avatar picture, name, virtual meeting title, and third camera toggle button 535.

Further to the embodiment depicted in FIG. 5, the right column of information relates to a list of available times that the virtual meeting may take place. Each of these virtual meeting options may be associated with a different level of associated sustainability. The options shown in FIG. 5 include a first plurality of options associated with a first indication 550. In some embodiments, this first indication 550 may be associated with virtual meeting times that have a suitable sustainability level, which may be indicated by a green color. In additional embodiments, the first indication 550 may be associated with virtual meeting options that are associated with a sustainability level that is more than a determined sustainability threshold. More details regarding how sustainability thresholds are determined are described below with respect to FIG. 8.

Likewise, a second indication 570 may be present that, in certain embodiments, may be represented by the color red to indicate that those virtual meeting options are associated with a decreased level of sustainability. In more embodiments, the second indication 570 can be configured to signal to the host/attendee/participant that those virtual meeting options are associated with a sustainability level that is less than a determined sustainability threshold. In additional embodiments, a third indication 560, which may be represented as yellow within the virtual meeting options, can be configured to indicate that they are associated with a selection of sustainability metrics that is within a range of a determined sustainability threshold. In some embodiments, the third indication 560 simply be classified as being in between the highest and lowest levels of sustainability possible for the virtual meeting based on the provided options/configurations.

During the course of setting up, and/or voting on a virtual meeting option, other configurations may be provided that can adjust the level of sustainability of the virtual meeting, and thus provide for the changing of the plurality of indications 550-570. In the embodiment depicted in FIG. 5, the first camera toggle button 515 and second camera toggle button 525 indicate that the first invitee 510 and second invitee 520 are planning to not have their cameras on during the virtual meeting. However, the third camera toggle button 535 indicates that the third invitee 530 does intend to have their camera on. By toggling a camera button on or off, the overall sustainability of the virtual meeting can change. As a result, various embodiments may re-evaluate the categorization of various virtual meeting options and re-assign them to different indications.

Likewise, the embodiment in FIG. 5 also shows an indication that a particular room can be selected through a room text input 590. Each room that a host/participant can attend the meeting in may have different devices or power source types and can therefore also adjust the overall sustainability of the virtual meeting options, such that when a room is selected, the indications may change to communicate the reassessed level of sustainability with the provided options. Finally, in a number of embodiments, an option selector 580 can be provided to allow a host/participant to make a selection, which can then be transferred back to a virtual meeting server for further processing.

Although a specific embodiment for a virtual meeting scheduling interface with a plurality of indications associated with sustainability is described above with respect to FIG. 5, any of a variety of systems and/or processes may be utilized in accordance with embodiments of the disclosure. For example, the ability to toggle various device-specific sustainability configurations may be available as well. In further embodiments, the host and/or participant may have an interface element that can indicate whether they will allow for the automatic adjustment of one or more features or configurations of the virtual meeting in order to keep the sustainability levels of the virtual meeting beneath a determined sustainability threshold. The elements depicted in FIG. 5 may also be interchangeable with other elements of FIGS. 1-4 and 6-10 as required to realize a particularly desired embodiment.

Figure 6:
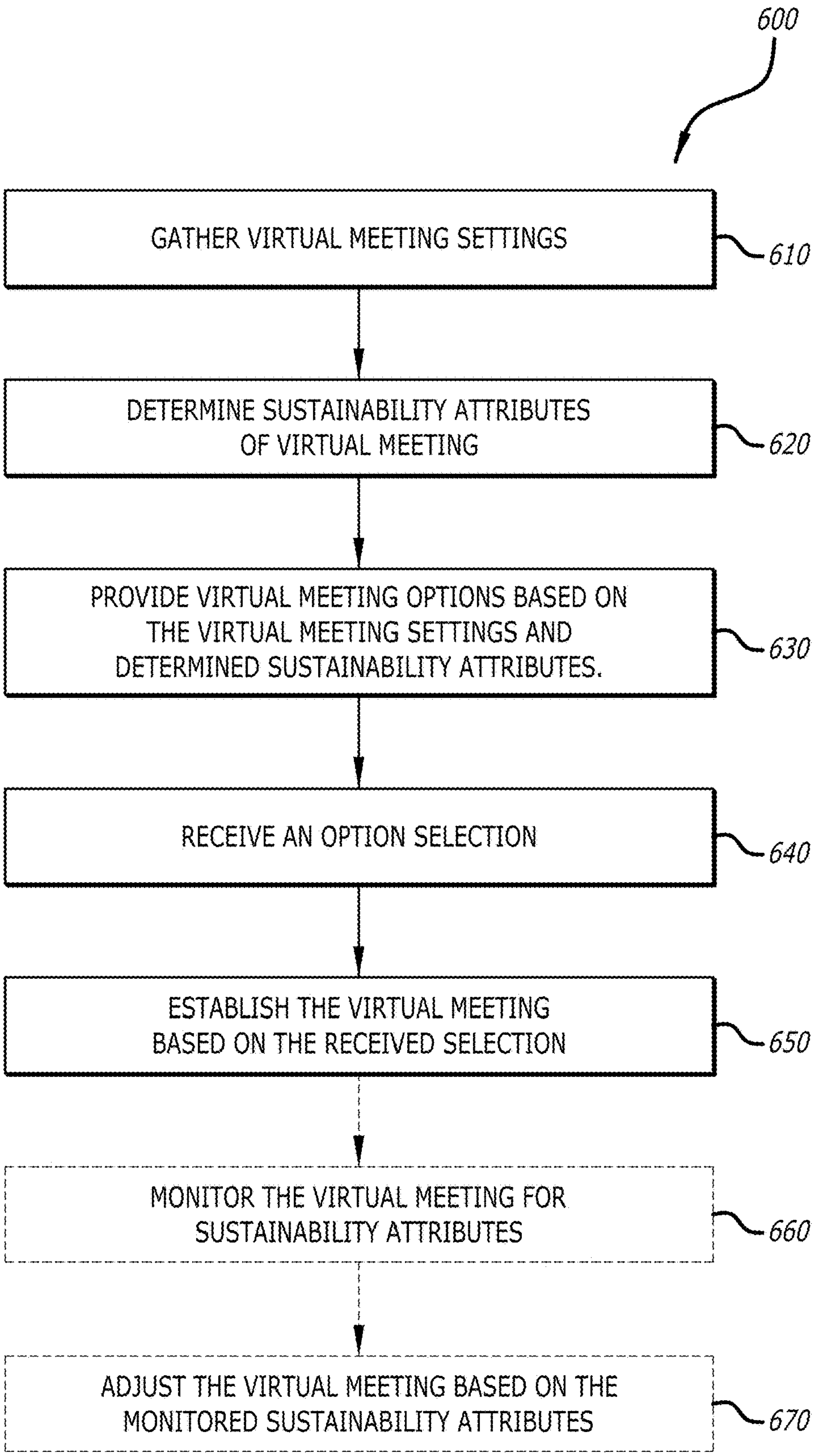
FIG. 6 is a flowchart depicting a process for establishing a sustainable virtual meeting in accordance with various embodiments of the disclosure.

Referring to FIG. 6, a flowchart depicting a process 600 for establishing a sustainable virtual meeting in accordance with various embodiments of the disclosure is shown. As shown, in various embodiments, virtual meeting settings may be gathered, which may include, by way of non-limiting example, one or more settings of the virtual meeting such as the number of participants, the camera settings of those participants (camera on or off; high-definition versus standard-definition, etc.), the purpose of the meeting, the configuration of the meeting (one-to-many, many-to-many, etc.), the location, room, and/or the time and date of the meeting (block 610). These settings may be utilized to determine the virtual meeting platform and one or more features to be used.

In many embodiments, various sustainability attributes of virtual meetings can be determined (block 620). For example, one or more sustainability attributes of the virtual meetings may be identified. These sustainability attributes may include, by way of non-limiting example, aspects of energy consumption, carbon emissions, and accessibility. It should be appreciated that virtual meetings consume energy because they require the use of electronic devices, such as computers, smartphones, tablets, and webcams, that consume electricity to function. Furthermore, virtual meetings typically involve the transmission of data and audiovisual content over the internet, which requires the use of servers and data centers that consume energy. The energy consumption of these devices and infrastructure is largely dependent on their processing power and the length and intensity of the virtual meeting. Energy consumption can be reduced by using energy-efficient devices, optimizing the virtual meeting settings, and reducing the number of participants. Similarly, the energy consumption of virtual meetings may lead to carbon emissions, which contribute to climate change. To that end, carbon emissions may be reduced by using renewable energy sources, optimizing the virtual meeting settings, and reducing the number of participants.

It is envisioned that the one or more of the forgoing sustainability attributes may help in selecting the most sustainable virtual meeting option. Virtual meeting options can be provided based on the virtual meeting settings and determined sustainability attributes (block 630). In this step, the virtual meeting options may be presented based on the gathered virtual meeting settings and the determined sustainability attributes. The options may include different virtual meeting platforms with different features that meet the sustainability attributes. As shown in the embodiment depicted in FIG. 5, the options presented may include one or more indications on sustainability-related attributes, such as color or shading of available meeting times.

Subsequently, an option selection can be received (block 640). For example, the participant may select a virtual meeting option based on certain preferences and sustainability requirements. In a number of embodiments, the virtual meeting can be established based on the received selection (block 650). In this step, the virtual meeting is often established using the selected virtual meeting platform, settings, and/or features. This may include setting up the virtual meeting room, inviting the participants, and configuring any of various audio and video settings alone or in combination.

In certain optional embodiments, the virtual meeting may be monitored for sustainability attributes based on one or more metrics (block 660). For example, the virtual meeting may be monitored for sustainability attributes such as energy consumption and/or carbon emissions. This may involve using sustainability software or tools to measure the sustainability metrics. As a result, additional optional embodiments may, adjust the virtual meeting based on the monitored sustainability attributes (block 670). For example, the meeting is adjusted based on the monitored sustainability attributes. This may include turning off unnecessary features or reducing the number of participants to reduce energy consumption and carbon emissions. The meeting may also be adjusted based on data privacy concerns or accessibility requirements.

Although a specific embodiment for a establishing a sustainable virtual meeting is described above with respect to FIG. 6, any of a variety of systems and/or processes may be utilized in accordance with embodiments of the disclosure. For example, the process 600 may be carried out by a server within the virtual meeting service system or by a device operated by one of the virtual meeting participants. Additionally, the elements described in FIG. 6 may also be interchangeable with other elements of FIGS. 1-5 and 7-10 as required to realize a particularly desired embodiment.

Figure 7:
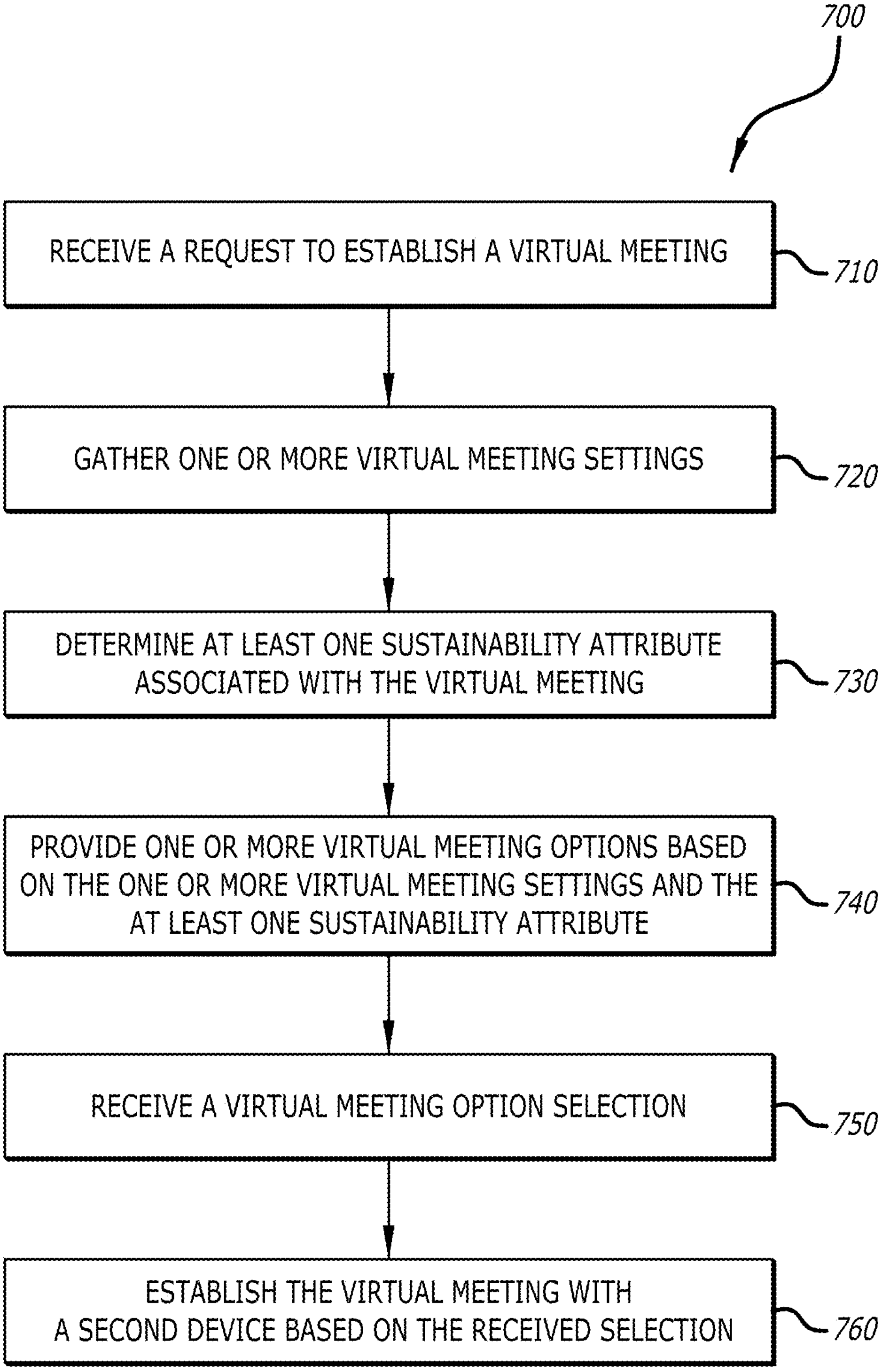
FIG. 7 is a flowchart depicting a more detailed process for establishing a sustainable virtual meeting in accordance with various embodiments of the disclosure.

Referring to FIG. 7, a flowchart depicting a more detailed process 700 for establishing a sustainable virtual meeting in accordance with various embodiments of the disclosure is shown. When receiving a request to establish a virtual meeting, it is important to gather the necessary information to ensure the meeting is set up correctly. In many embodiments, a virtual meeting device, logic, or other specialized tool may receive a request to establish a virtual meeting (block 710). This request may include a proposed date and time window suitable for the meeting, the potential number of participants, and/or the purpose or configuration of the meeting. It is also often determined who will be responsible for setting up and managing the virtual meeting.

Gathering virtual meeting settings can involve selecting the appropriate software, hardware, and other technology required to set up and run the virtual meeting (block 720). As discussed above with reference to FIG. 6, this gathering may include selecting a video conferencing platform, setting up microphones and speakers, and ensuring that all participants have access to the necessary technology. Other settings that may need to be considered include the layout of the virtual meeting, the types of presentations or materials that will be shared, and the level of interactivity required, camera settings, participant device settings, virtual meeting type, etc.

In more embodiments, at least one sustainability attribute associated with the virtual meeting can be determined (block 730). Often, this can involve considering the environmental impact of the meeting and identifying ways to reduce that impact. In further embodiments, it can be determined which sustainability-related configuration on user devices may be selected on or off. In still additional embodiments, some of these participant devices can either allow for or provide an opt-in to the virtual meeting software/logic to automatically enable or disable one or more settings. As described in more detail below, these configurations can be adjusted dynamically based on one or more sustainability-related thresholds.

In response to the virtual meeting settings and sustainability attributes being identified, one or more virtual meeting options can be provided (block 740). In a number of embodiments, these options can be configured to take into account the needs and preferences of the participants, as well as the sustainability goals of the meeting. For example, options might include different video conferencing platforms, different virtual meeting layouts, various meeting times, a combination of available participant settings, and/or different levels of interactivity. This may involve providing a list of options and asking participants to choose their preferred option, or it may involve presenting a single option and asking participants to confirm that it is acceptable. In many embodiments, once the virtual meeting options have been provided, a virtual meeting option selection is received from the host(s) and/or participant(s) (block 750).

Finally, the virtual meeting may be established with a second device based on the received selection (block 760). In various embodiments, this may involve setting up the video conferencing platform, ensuring that all participants are connected and able to communicate effectively, and providing any necessary technical support throughout the meeting. By following these steps and considering sustainability attributes throughout the process, virtual meetings may be set up in a way that desirably reduces their environmental impact while still providing an effective and engaging communication platform.

Although a specific embodiment for a more detailed process 700 for establishing a sustainable virtual meeting is described above with respect to FIG. 7, any of a variety of systems and/or processes may be utilized in accordance with embodiments of the disclosure. For example, the sustainability-related attributes related to the participants may be determined through accessing one or more public or service-based data stores. Additionally, some device configurations may be provided by the manufacturer of a device to indicate what sustainability-related configurations may be possible to reduce energy usage during a virtual meeting at an end-user's device. The elements described in FIG. 7 may also be interchangeable with other elements of FIGS. 1-6, and 8-10 as required to realize a particularly desired embodiment.

Figure 8:
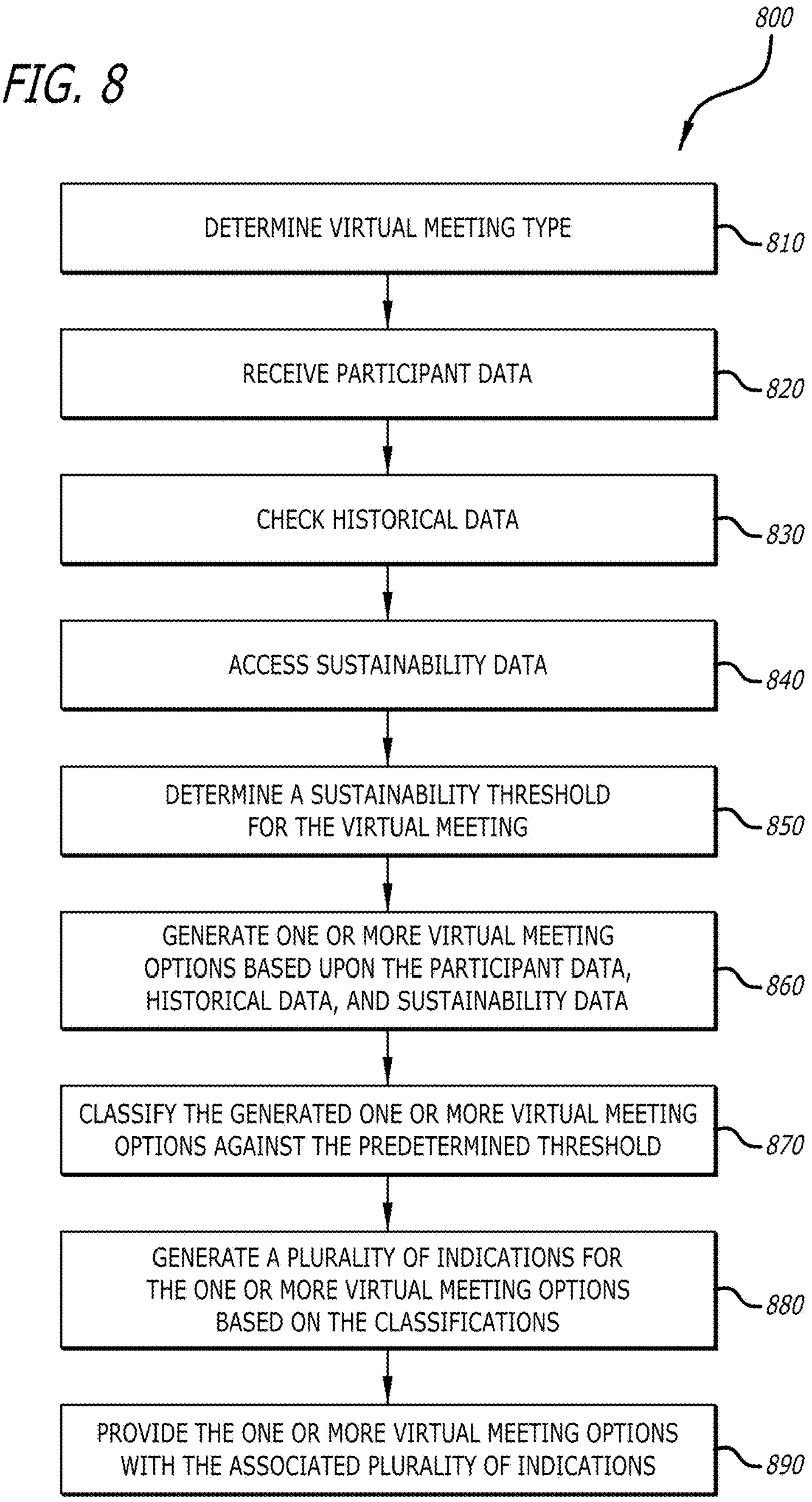
FIG. 8 is a flowchart depicting a process for providing virtual meeting options with a plurality of indications in accordance with various embodiments of the disclosure.

Referring to FIG. 8, a flowchart depicting a process 800 for providing virtual meeting options with a plurality of indications in accordance with various embodiments of the disclosure is shown. In many embodiments, the process 800 can determine a virtual meeting type (block 810). As described above, the meeting type may be configured as a one-to-one, many-to-one, or a many-to-many type meeting. Other considerations may include identifying the purpose and format of the virtual meeting, such as whether it is a conference call, video conference, or webinar. It is envisioned that the virtual meeting type could be used to determine one or more virtual meeting options and sustainability metrics that will be used to generate the options.

In a number of embodiments, the process 800 may receive participant data (block 820). Participant data can vary but may include, for example, location, language, time zone, audio/visual settings, and/or accessibility needs. The participant data may be an important component in determining the virtual meeting options that can be generated, as it may help identify the technology and language requirements, as well as any accessibility needs.

In more embodiments, the process 800 can check historical data from past virtual meetings (block 830). This step can involve reviewing data from past virtual meetings, such as energy usage, attendance rates, participation rates, settings, location, and/or feedback. In this way, accessing and utilizing historical data can help identify more optimal virtual meeting options and potential sustainability practices that can be incorporated into the current virtual meeting. For example, energy consumption may be analyzed, as it may include data on the amount of energy used during past virtual meetings, such as the number of devices connected and the duration of the meeting. In additional embodiments, the process 800 can determine historical data related to each specific participant which may include previous devices utilized, settings used, energy used, and/or the source of energy utilized. Similarly, carbon emissions may be analyzed, which includes data on the carbon footprint of past virtual meetings (either aggregate or on a per-user basis), such as the amount of greenhouse gases emitted due to energy consumption.

Attendance records may also be analyzed in some embodiments, which may include data regarding the number of participants who attended past virtual meetings, as well as their geographical location and time zone. In some embodiments, meeting duration metrics may be reviewed, which can include data regarding the length of past virtual meetings, including the start and end times. The historical data may also include information or data regarding the types of technology used during past virtual meetings, such as the video conferencing platform, file-sharing tools, and other collaboration software. In some embodiments, feedback from meeting participants may also be utilized to determine satisfaction levels of past virtual meeting participants, as well as feedback on the meeting structure, format, and content.

In further embodiments, the process 800 can access one or more sources of sustainability data (block 840). Accessing sustainability data can involve gathering data on any of various sustainability metrics, including by way of non-limiting example, energy consumption, carbon emissions, waste reduction, accessibility, and/or social responsibility. In a variety of embodiments, sustainability data can be used to set thresholds for sustainability performance and identify sustainability practices that can be incorporated into the virtual meeting options.

In various embodiments, a sustainability threshold for the virtual meeting can be determined (block 850). For example, a target sustainability performance level may be established based on at least previously accessed sustainability data. The sustainability threshold may be used to help determine which virtual meeting options meet the desired sustainability performance level. In some embodiments, the sustainability threshold for a virtual meeting may be determined by setting a target sustainability performance level based on the sustainability metrics that are important for the organization or group hosting the virtual meeting. Such sustainability metrics may vary depending on the organization's values and goals, but common sustainability metrics for virtual meetings may include energy consumption, carbon emissions, waste reduction, accessibility, and social responsibility.

To determine the sustainability threshold, an organization may establish a baseline level of performance for each sustainability metric and set a target level for improvement. For example, if the organization's goal is to reduce carbon emissions, they may set a target of 25% reduction in emissions compared to the baseline level. The sustainability threshold can also be set based on industry standards or best practices for virtual meetings. Once the sustainability threshold is established, virtual meeting options may be evaluated against the threshold to determine if they meet the desired sustainability performance level. Virtual meeting options that do not meet the sustainability threshold can be modified or discarded in favor of options that meet the threshold.

In a variety of embodiments, the process 800 may generate one or more virtual meeting options based upon the participant data, historical data, and sustainability data (block 860). In certain embodiments, this can involve using the data collected in blocks 820-850 to generate virtual meeting options that meet the participant needs, historical success factors, and sustainability performance thresholds. In further embodiments, the process 800 can further classify the generated virtual options with respect to the predetermined thresholds (block 870). This may involve evaluating the generated virtual meeting options against the predetermined sustainability thresholds to determine if they meet the desired sustainability performance level. As those skilled in the art will recognize, classifying the one or more virtual meeting options can be done in any variety of ways and in any number of categories based on a variety of factors as needed to realize the desired application.

In various embodiments, the process 800 can generate a plurality of indications for the one or more virtual meeting options based on the classifications (block 880). Often, this can involve providing feedback regarding the sustainability performance of the generated virtual meeting options, such as energy consumption, carbon emissions, and waste reduction. The indications can be configured to help the participants select the virtual meeting option that meets their needs and aligns with their sustainability values. In some embodiments, the plurality of indications can be a plurality of unique colors, such as green to indicate that an option results in the virtual meeting being below a determined sustainability threshold. Conversely, red may be utilized to indicate that the virtual meeting option being selected can result in the virtual meeting not meeting a determined sustainability threshold. Likewise, when a virtual meeting option is within a predetermined range of the determined sustainability threshold, the indication associated with that can be yellow in some embodiments. However, those skilled in the art will recognize that there are a number of ways that the plurality of indications could be generated for each classification.

Subsequently, the one or more virtual meeting options can be provided with the associated plurality of indications (block 890). In certain embodiments, the process 800 may present the generated virtual meeting options to the participants along with the sustainability performance feedback. The participants can use this information to make an informed decision regarding which virtual meeting option to select that best meets their needs and aligns with their sustainability values. Likewise, in some embodiments, the provided virtual meeting options and associated plurality of indications can be dynamically adjusted (via reclassification, etc.) in response to the participant selecting one or more options. For example, if a participant selects a box that indicates that they will be participating without a video feed, the indications associated with the one or more virtual meeting options may change such that a participant can be encouraged to adjust one or more configurations within their device to achieve a virtual meeting option that satisfies the determined sustainability threshold for the virtual meeting.

Although a specific embodiment for a process 800 for providing virtual meeting options with a plurality of indications is described above with respect to FIG. 8, any of a variety of systems and/or processes may be utilized in accordance with embodiments of the disclosure. For example, in some embodiments, the sustainability threshold may be selected by a host or virtual meeting administrator. In certain embodiments, the sustainability threshold may be automatically generated based on one or more heuristics and/or machine learning methods. The elements described in FIG. 8 may also be interchangeable with other elements of FIGS. 1-7, and 9-10 as required to realize a particularly desired embodiment.

Figure 9:
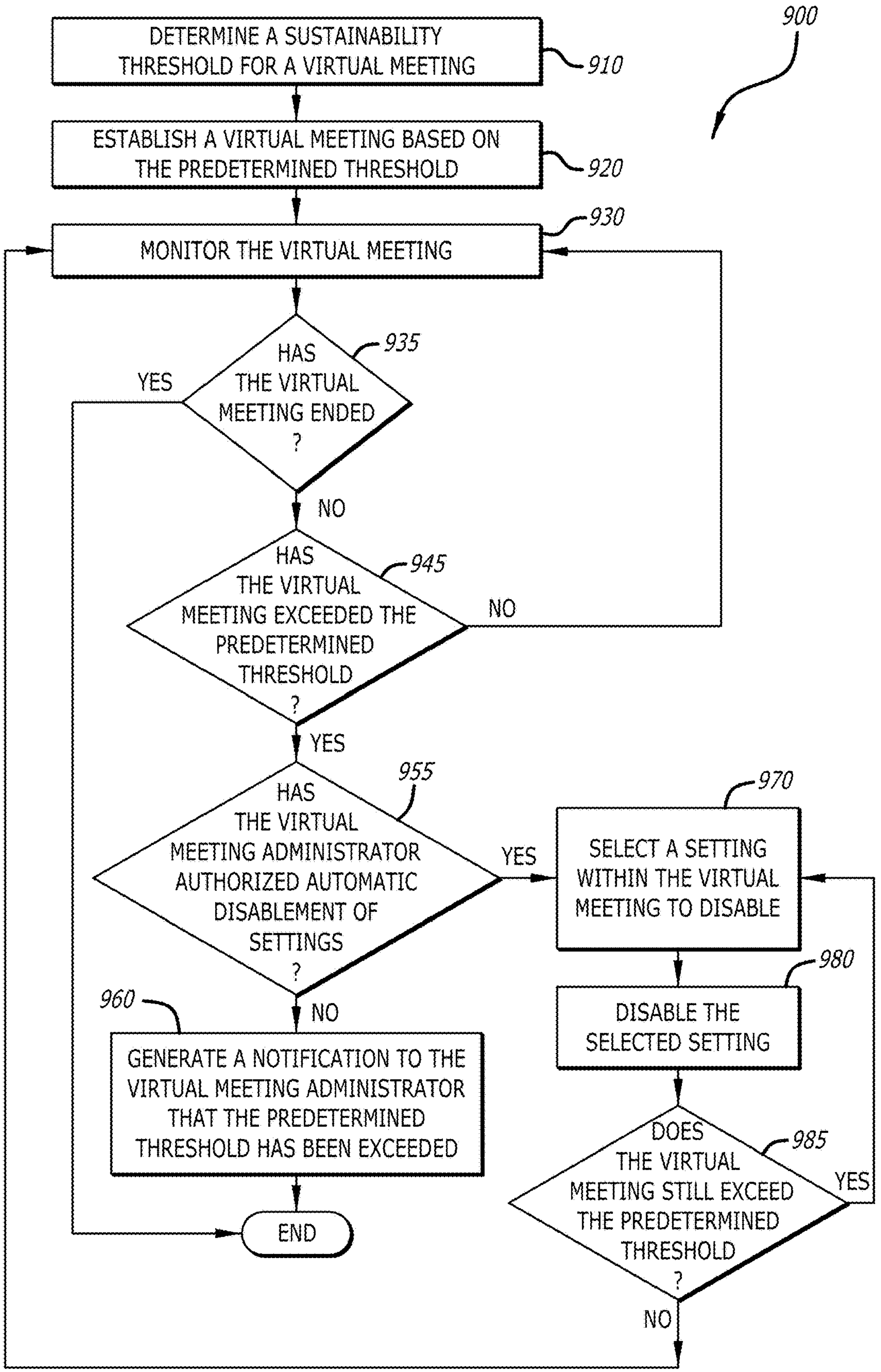
FIG. 9 is a flowchart depicting a process for dynamically adjusting one or more settings of the virtual meeting based on sustainability data in accordance with various embodiments of the disclosure.

Referring to FIG. 9, a flowchart depicting a process 900 for dynamically adjusting one or more settings of the virtual meeting based on sustainability data in accordance with various embodiments of the disclosure is shown. In many embodiments, the process 900 can determine a sustainability threshold for a virtual meeting. This involves setting a limit on the amount of energy or resources that can be used during the meeting. The threshold can be determined based on various factors, such as the number of participants, the length of the meeting, and the type of activities that will be conducted during the meeting. The process for determining a sustainability threshold is described in more detail above.

In additional embodiments, the process 900 can establish a virtual meeting based on the predetermined threshold (block 920). As also described above, this may involve selecting a virtual meeting platform with a plurality of options that can allow for energy-efficient features that allow for sustainable meeting practices, such as document sharing and any of various collaboration tools. During the virtual meeting, the process 900 can monitor the energy consumption and resource usage to ensure that the predetermined threshold is not exceeded (block 930). This may involve tracking the energy usage of devices, such as computers, microphones, and webcams, and monitoring the use of lighting and air conditioning. This may also include both the energy used during the meeting and standby energy when the devices are not in use.

In a number of embodiments, the process 900 can determine if the virtual meeting has ended (block 935). When the meeting has ended, the process 900 can end. However, if the meeting has not ended, the process 900 can further determine if the virtual meeting has exceeded the predetermined sustainability threshold (block 945). If the determination is that the predetermined threshold has not been exceeded, then the process 900 may once again monitor the virtual meeting (block 930). However, if the virtual meeting has exceeded the predetermined threshold, the process 900 may again further determined if the virtual meeting administrator has authorized automatic disablement of settings (block 955). If automatic disablement of settings has not been authorized, the process 900 can generate a notification to the virtual meeting administrator that the predetermined sustainability threshold has been exceeded (block 960). In various embodiments, the process 900 can then end. However, some embodiments may continue to monitor the virtual meeting (block 930).

However, if the virtual meeting administrator has authorized the automatic disablement of settings, the process 900 can select a setting within the virtual meeting to disable (block 970). It will be appreciated by those skilled in the art that various settings can have an impact on various aspects of sustainability. For example, video quality may be reduced to decrease the amount of data transferred during the meeting, leading to lower energy consumption and less strain on internet bandwidth. Similarly, the audio quality may be reduced, thereby reducing the amount of data transferred during the meeting, leading to lower energy consumption. Many virtual meetings provide the option for screen sharing, a setting which may be disabled or limited to reduce the amount of data transferred during the meeting. In some embodiments, participants may be encouraged to mute their microphones when they are not speaking to reduce background noise and lower energy consumption.

In response to a setting within the virtual meeting being disabled, various embodiments of the process 900 can disable the selected setting (block 980). In some embodiments, the process 900 may reenable the disabled setting when it is determined that the predicted energy usage of the disabled setting would not facilitate the virtual meeting exceeding the sustainability threshold should it be reenabled. However, disabling the selected setting may not always reduce the virtual meeting sustainability levels below the sustainability threshold. Thus, a variety of embodiments of the process 900 can further determine if the virtual meeting still exceeds the predetermined threshold (block 985). If the sustainability threshold is still exceeded, the process 900 can again select a setting within the virtual meeting to disable (block 970). Likewise, when the sustainability threshold is no longer exceeded, some embodiments of the process 900 can return to monitoring the virtual meeting (block 930).

Although a specific embodiment for a process for dynamically adjusting one or more settings of the virtual meeting based on sustainability data is described above with respect to FIG. 9, any of a variety of systems and/or processes may be utilized in accordance with embodiments of the disclosure. For example, in some embodiments, the process 900 may select a setting enable wherein the selected setting is configured to reduce energy usage when enabled. The elements described in FIG. 9 may also be interchangeable with other elements of FIGS. 1-8, and 10 as required to realize a particularly desired embodiment.

Figure 10:
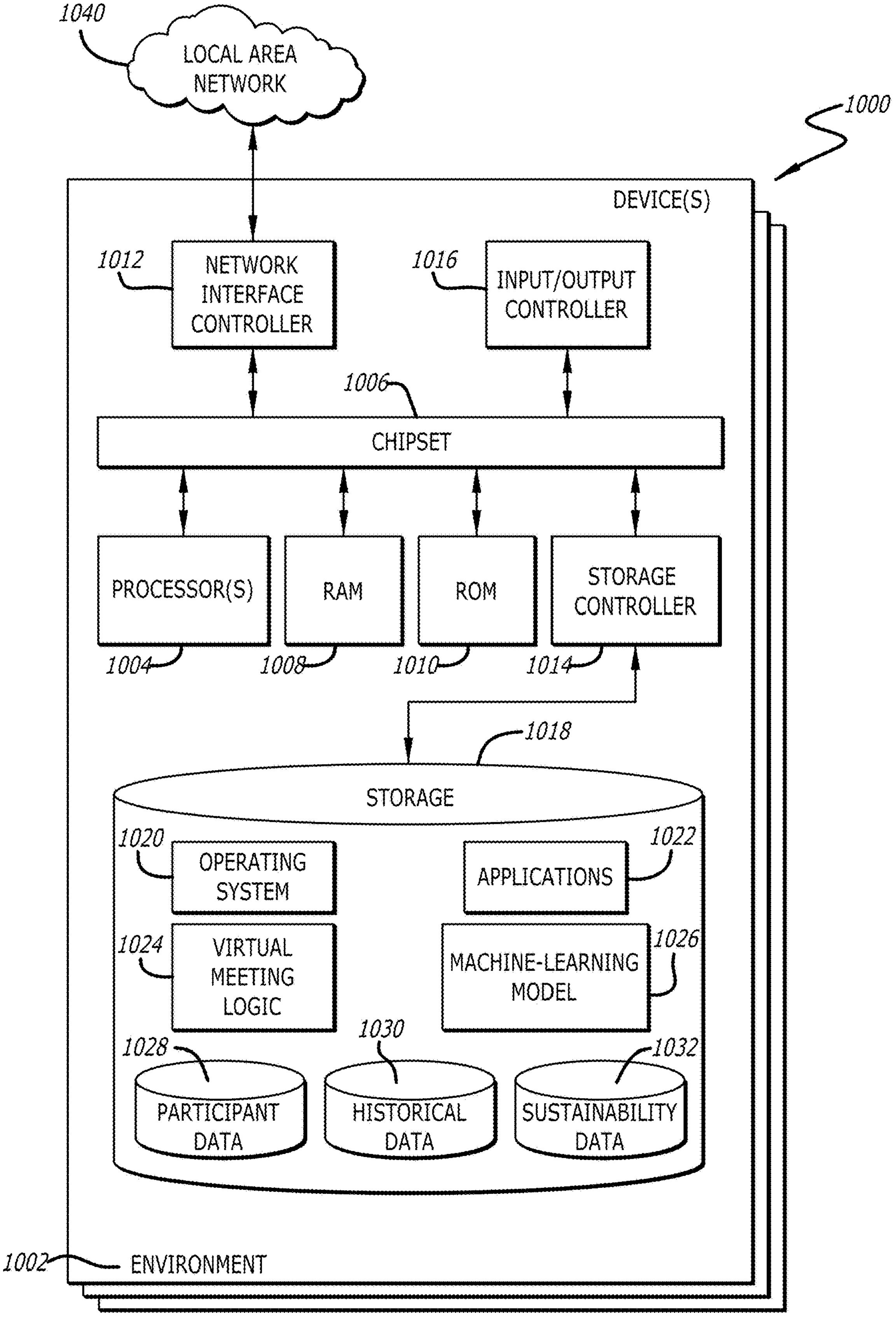
FIG. 10 is a conceptual block diagram of a device suitable for use in a dynamic reduced size video transmission data rate collaboration system in accordance with various embodiments of the disclosure.

Referring to FIG. 10, a conceptual block diagram of a device suitable for use in a dynamic reduced size video transmission data rate collaboration system in accordance with various embodiments of the disclosure is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more controller(s) 1004, such as, but not limited to, central processing units (CPUs), processors, etc. that can be configured to operate in conjunction with a chipset 1006. The controller(s) 1004 can be standard programmable CPUs that perform arithmetic and logical operations necessary for the operation of the device 1000.

In additional embodiments, the controller(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the controller(s) 1004 and the remainder of the components and devices within the environment 1002. The chipset 1006 can provide an interface to a random-access memory (RAM 1008), which can be used as the main memory in the device 1000 in some embodiments. In a number of embodiments, the memory can be communicatively coupled to the controller(s) 1004 to carry out one or more instructions. The chipset 1006 can further be configured to provide an interface to a computer-readable storage medium such as a read-only memory (ROM 1010) or non-volatile RAM (NVRAM) for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface controller 1012, which may provide access to external devices through, for example, a plurality of communication ports such as, but not limited to, a network interface card (NIC). A NIC may comprise a gigabit Ethernet adapter or similar component. The plurality of communication ports can be capable of connecting or otherwise coupling the device 1000 to other devices over the network 1040. It is contemplated that multiple communication ports, such as NICs may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, and data, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by a device 1000 or a plurality of devices operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the controller(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a virtual meeting logic 1024, that can be configured to perform one or more of the various steps, processes, operations, and/or other methods that are described above. Often, the virtual meeting logic 1024 can be a set of instructions stored within a non-volatile memory that, when executed by the processor(s)/controller(s) 1004 can carry out these steps, etc. In some embodiments, the virtual meeting logic 1024 may be a client application that resides on a network-connected device, such as, but not limited to, a personal or mobile computing device. In these embodiments, the virtual meeting logic 1024 can facilitate the establishment and conduct one or more virtual meetings within the device, such as those devices depicted in FIGS. 1 and 3-4. In certain embodiments, the virtual meeting logic 1024 may be configured to coordinate the generation of a sustainability threshold and/or categorize one or more virtual meeting options based on available data and the sustainability threshold. In further embodiments, the virtual meeting logic 1024 may monitor the virtual meeting for exceeding a sustainability threshold and transmit one or more signals to devices conducting the virtual meeting to enable and/or disable one or more settings.

In a number of embodiments, the storage 1018 can include participant data 1028. As described above, participant data 1028 can be utilized to optimize the sustainability of a virtual meeting. In some embodiments, the participant data 1028 can include, but is not limited to, participant location, computing device type, network connection type, audio/visual settings, participant status (host, attendee, etc.), and/or participant availability. The participant data 1028 can be utilized to develop one or more sustainability thresholds. In additional embodiments, the participant data 1028 may be provided by the participant when accepting the virtual meeting invite.

In various embodiments, the storage 1018 can include historical data 1030. Within a virtual meeting, one or more video transmission streams are likely to be utilized by one or more users. Each of these users have likely participated in other virtual meetings prior. Data related to these pasts virtual meetings and other interactions can be stored as historical data 1030. In certain embodiments, historical data 1030 can include, but is not limited to, past device power usage, past device settings (did the participant have the camera on, did they mute between talking, etc.), past location and associated power source type, past virtual meeting behaviors (did the participant leave the meeting early, etc.).

In still more embodiments, the storage 1018 can include sustainability data 1032. As described above in the discussion of FIG. 2, sustainability data can include sustainability attributes of various devices, elements, and other components of a virtual meeting network as well as sustainability configurations of one or more devices in the virtual meeting network. The sustainability data 1032 may comprise both capability data related to various devices but can also include the power source type associated with each device within a network proposed or being utilized by a virtual meeting. In some embodiments, the sustainability data 1032 can include data related to the power usage of a computing device, such that when a participant reports utilizing a specific computing device, the manufacturers expected power usage may be available as part of the sustainability data 1032. In additional embodiments, the sustainability data 1032 may include data related to the data travelling along the network (how many hops, power source data of devices between the participant endpoints, etc.).

Finally, in many embodiments, data may be processed into a format usable by one or more machine-learning (ML) model(s) 1026 (e.g., feature vectors), and or other pre-processing techniques. The ML model(s) 1026 may be any type of ML model, such as any of various supervised models, reinforcement models, and/or unsupervised models. The ML model(s) 1026 may include one or more of linear regression models, logistic regression models, decision trees, Naïve Bayes models, neural networks, k-means cluster models, random forest models, and/or other types of ML model(s) 1026.

The ML model(s) 1026 can be configured to generate inferences to make predictions or draw conclusions from data. An inference can be considered the output of a process of applying a model to new data. This can occur by learning from historical data and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc.

The ML model(s) 1026 may be configured to predict the usage and/or configurations of a better sustainability-optimized virtual meeting. Likewise, the ML model(s) 1026 may be configured in certain embodiments to monitor and recognize when a virtual meeting has exceeded a sustainability threshold. Similarly, the ML model(s) 1026 can select which setting may be optimal in reducing the overall energy usage within the virtual meeting to satisfy the sustainability threshold without also negatively affecting user experience past a particular amount.

Although a specific embodiment for a device suitable for carrying out the various steps, processes, methods, and operations described above is discussed with respect to FIG. 10, any of a variety of systems and/or processes may be utilized in accordance with embodiments of the disclosure. For example, the device may be virtualized or disposed as a logic and data stores within a mobile or personal general computing device, allowing for the transformation of the device, upon execution by a processor/controller, to a virtual meeting device capable of generating indications for selecting and regulating a more sustainable virtual meeting. The elements depicted in FIG. 10 may also be interchangeable with other elements of FIGS. 1-9 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
a processor;
a memory communicatively coupled to the processor;
a communication port coupled with a second device; and
a virtual meeting logic configured to:
receive a request to establish a virtual meeting with a plurality of participants;
gather one or more virtual meeting settings associated with each of the plurality of participants;
determine a sustainability attribute associated with the virtual meeting;
provide one or more virtual meeting options based on the one or more virtual meeting settings and the sustainability attribute;
receive a virtual meeting option selection;
establish the virtual meeting with the second device based on the received selection;
monitor the sustainability attribute associated with the virtual meeting during the virtual meeting;
determine if the sustainability attribute associated with the virtual meeting exceeds a predetermined threshold;
classify the one or more virtual meeting options against the predetermined threshold; and
generate one or more indications for the one or more meeting options based on at least one classification.

2. The device of claim 1, wherein the one or more virtual meeting settings include at least: participant connection type, participant camera settings, or participant status.

3. The device of claim 2, wherein the sustainability attribute associated with the virtual meeting can include at least: participant device information, participant location, or participant power source type.

4. The device of claim 3, wherein the virtual meeting logic is further configured to determine a sustainability threshold associated with the virtual meeting.

5. The device of claim 4, wherein the one or more indications are displayed based on the determined sustainability threshold.

6. The device of claim 5, wherein the one or more indications comprise a plurality of unique colors for each indication.

7. The device of claim 6, wherein the displaying the one or more indications comprise showing a first plurality of meeting times with a first indication color in response to the sustainability attributes associated with a second plurality of meeting times being below the determined sustainability threshold.

8. The device of claim 7, wherein a unique color association with the first indication is green.

9. The device of claim 6, wherein the displaying the one or more indications comprise showing a second plurality of meeting times with a second indication color in response to the sustainability attributes associated with the second plurality of meeting times being above the determined sustainability threshold.

10. The device of claim 7, wherein a unique color association with the first indication is red.

11. The device of claim 6, wherein the displaying the one or more indications comprise showing a third plurality of meeting times with a third indication color in response to the meeting time being within a predetermined range of the determined sustainability threshold.

12. The device of claim 7, wherein a unique color association with the first indication is yellow.

13. The device of claim 4, wherein providing the one or more virtual meeting options comprises displaying one or more suggested virtual meeting times and configurations based on the determined sustainability threshold.

14. The device of claim 13, wherein the one or more suggestions are configured to minimize negative environmental impacts of the virtual meeting.

15. A device, comprising:

a processor;

a memory communicatively coupled to the processor;

a communication port coupled with a second device; and a virtual meeting logic configured to:

receive a request to establish a virtual meeting with a plurality of participants;

gather one or more virtual meeting settings associated with each of the plurality of participants;

determine at least one sustainability attribute associated with the virtual meeting;

provide one or more virtual meeting options based on the one or more virtual meeting settings and the at least one sustainability attribute;

receive a virtual meeting option selection;

establish the virtual meeting with the second device based on the received selection;

monitor the sustainability attributes associated with the virtual meeting during the virtual meeting;

determine if the sustainability attributes associated with the virtual meeting have exceeded a predetermined threshold; and generate a plurality of indications for the one or more meeting options based on at least one classification.

16. The device of claim 15, in response to determining that the sustainability attributes associated with the virtual meeting have exceeded the predetermined threshold, generate at least one notification indicating the exceeding of the threshold.

17. The device of claim 15, in response to determining that the sustainability attributes associated with the virtual meeting have exceeded the predetermined threshold, disable one or more settings within the virtual meeting until the sustainability attributes associated with the virtual meeting are no longer exceeding the predetermined threshold.

18. A method for administering virtual meetings, comprising:

receiving a request to establish a virtual meeting with a plurality of participants operating computing devices on a network;

gathering one or more virtual meeting settings associated with each of the plurality of participants and their computing devices;

determining a sustainability attribute associated with the virtual meeting;

providing one or more virtual meeting options to a virtual meeting administrator based on the one or more virtual meeting settings and the sustainability attribute;

receiving a virtual meeting option selection;

establishing the virtual meeting with the computing devices based on the received selection;

monitoring the sustainability attribute associated with the virtual meeting during the virtual meeting;

determining if the sustainability attribute associated with the virtual meeting have exceeded a predetermined threshold;

classifying the one or more virtual meeting options against the predetermined threshold;

generating a plurality of indications for the one or more meeting options based on at least one classification; and dynamically adjusting the plurality of indications in response to a participant selecting one or more options.

19. The method of claim 18, wherein the one or more virtual meeting settings include at least: participant connection type, participant camera settings, or participant status.

20. The method of claim 18, wherein the sustainability attribute associated with the virtual meeting can include at least: participant device information, participant location, or participant power source type.

* * * * *